(12) United States Patent
Kim et al.

(10) Patent No.: US 9,713,133 B2
(45) Date of Patent: Jul. 18, 2017

(54) METHOD FOR TRANSCEIVING DOWNLINK CONTROL CHANNEL IN WIRELESS COMMUNICATION SYSTEM AND APPARATUS THEREFOR

(71) Applicant: LG ELECTRONICS INC., Seoul (KR)

(72) Inventors: Myoungseob Kim, Anyang-si (KR); Hakseong Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 48 days.

(21) Appl. No.: 14/375,336

(22) PCT Filed: Jan. 23, 2013

(86) PCT No.: PCT/KR2013/000538
§ 371 (c)(1),
(2) Date: Jul. 29, 2014

(87) PCT Pub. No.: WO2013/115519
PCT Pub. Date: Aug. 8, 2013

(65) Prior Publication Data
US 2015/0003364 A1    Jan. 1, 2015

Related U.S. Application Data

(60) Provisional application No. 61/592,585, filed on Jan. 30, 2012.

(51) Int. Cl.
*H04W 4/00* (2009.01)
*H04W 72/04* (2009.01)
*H04L 5/00* (2006.01)

(52) U.S. Cl.
CPC ......... *H04W 72/042* (2013.01); *H04L 5/0053* (2013.01); *H04L 5/001* (2013.01);
(Continued)

(58) Field of Classification Search
CPC .................................................. H04W 72/042
See application file for complete search history.

(56) References Cited

U.S. PATENT DOCUMENTS

| 2011/0170458 | A1  | 7/2011 | Chen et al. |
| 2011/0170496 | A1* | 7/2011 | Fong ..................... H04L 5/0053 370/329 |

(Continued)

FOREIGN PATENT DOCUMENTS

| CN | 102164416 A | 8/2011 |
| CN | 102170703 A | 8/2011 |

(Continued)

OTHER PUBLICATIONS

Motorola Mobility, "E-PDCCH Design Aspects," 3GPP TSG RAN WG1 #67, R1-114029, San Francisco, USA, Nov. 14, 2011-Nov. 18, 2011, pp. 1-4.

(Continued)

*Primary Examiner* — Chi H Pham
*Assistant Examiner* — Fahmida Chowdhury
(74) *Attorney, Agent, or Firm* — Birch, Stewart, Kolasch & Birch, LLP

(57) ABSTRACT

The present invention relates to a method for transceiving a downlink control channel in a wireless communication system and an apparatus therefor. Specifically, a method for transceiving a downlink control channel in a wireless communication system comprises a step of receiving a downlink signal comprising a first downlink control channel (Physical Downlink Control Channel, PDCCH) and a second downlink control channel (Enhanced PDCCH; EPDCCH), (Continued)

wherein a starting symbol index of the second downlink control channel is greater than the final symbol index of the first downlink control channel.

4 Claims, 12 Drawing Sheets

(52) U.S. Cl.
CPC .......... *H04L 5/0044* (2013.01); *H04L 5/0094* (2013.01); *H04W 72/04* (2013.01)

(56) References Cited

U.S. PATENT DOCUMENTS

| | | | | |
|---|---|---|---|---|
| 2011/0249633 | A1* | 10/2011 | Hong | H04L 5/0053 370/329 |
| 2011/0261858 | A1 | 10/2011 | Baldemair et al. | |
| 2012/0026935 | A1 | 2/2012 | Park et al. | |
| 2012/0213163 | A1* | 8/2012 | Lee | H04L 1/1861 370/329 |
| 2013/0114419 | A1* | 5/2013 | Chen | H04L 5/0053 370/248 |

FOREIGN PATENT DOCUMENTS

| | | |
|---|---|---|
| CN | 102215094 A | 10/2011 |
| CN | 102256358 A | 11/2011 |
| EP | 2 775 768 A1 | 9/2014 |
| KR | 10-2011-0000538 A | 1/2011 |
| WO | WO 2010/123304 A2 | 10/2010 |
| WO | WO 2011/106559 A2 | 9/2011 |

OTHER PUBLICATIONS

Samsung, "PDCCH Extension for ICIC and Capacity Gains," 3GPP TSG RAN WG1 #61, R1-103046, Montreal, Canada, May 10-14, 2010, pp. 1-2.

* cited by examiner (a) control-plane protocol stack (b) user-plane protocol stack

METHOD FOR TRANSCEIVING DOWNLINK CONTROL CHANNEL IN WIRELESS COMMUNICATION SYSTEM AND APPARATUS THEREFOR

CROSS REFERENCE TO RELATED APPLICATIONS

This application is the National Phase of PCT International Application No. PCT/KR2013/000538, filed on Jan. 23, 2013, which claims priority under 35 U.S.C. 119(e) to U.S. Provisional Application No. 61/592,585, filed on Jan. 30, 2012, all of which are hereby expressly incorporated by reference into the present application.

TECHNICAL FIELD

The present invention relates to wireless communication system, and more particularly, to a method for transceiving a downlink control channel in a wireless communication system, and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

An object of the present invention devised to solve the conventional problem is to provide a method for transceiving a downlink control channel and a data channel in a wireless communication system and an apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method for allowing a user equipment to receive a downlink control channel in a wireless communication system comprises the step of receiving a downlink signal, which includes a first downlink control channel (physical downlink control channel, PDCCH) and a second downlink control channel (Enhanced PDCCH; EPDCCH), wherein a starting symbol index of the second downlink control channel is greater than the last symbol index of the first downlink control channel.

Moreover, a symbol interval to which the first downlink control channel is transmitted is indicated by a control format indicator (CFI), and the starting symbol index of the second downlink control channel is defined on the basis of the control format indicator.

Moreover, the starting symbol index of the second downlink control channel is defined using higher layer signaling, and is greater than the last index of a maximum symbol interval to which the first downlink control channel may be transmitted.

Moreover, a frequency domain of the second downlink control channel is defined cell specifically using higher layer signaling.

Moreover, the method further comprises the step of decoding a downlink data channel (Physical Downlink Shared Channel, PDSCH) corresponding to the second downlink control channel, wherein the starting symbol index of the downlink data channel is defined equally to the starting symbol index of the second downlink control channel.

Moreover, a search space for acquiring the second downlink control channel is a common search space or a user equipment specific search space, and if the search space is the common search space, the starting symbol index of the second downlink control channel is defined through higher layer signaling.

Moreover, the downlink signal is received through a plurality of carriers based on carrier aggregation, and if the search space for acquiring the second downlink control channel is the common search space, the starting symbol index of the second downlink control channel is defined equally to the received carriers.

In another aspect of the present invention, a user equipment for receiving a downlink signal in a wireless communication system comprises a radio frequency (RF) unit; and a processor, wherein the RF unit is configured to receive a downlink signal, which includes a first downlink control channel (Physical Downlink Control CHannel, PDCCH) and a second downlink control channel (Enhanced PDCCH; EPDCCH), and a starting symbol index of the second downlink control channel is greater than the last OFDM symbol index of the first downlink control channel.

In other aspect of the present invention, a method for allowing a base station to transmit a downlink control channel in a wireless communication system comprises the steps of allocating resources for a first downlink control channel (physical downlink control channel, PDCCH) and a second downlink control channel (Enhanced PDCCH; EPDCCH) to a downlink signal; and transmitting the downlink signal to a user equipment by using the allocated resources, wherein a starting symbol index of the second downlink control channel is greater than the last symbol index of the first downlink control channel.

Advantageous Effects

According to the present invention, the base station may efficiently allocate resources for a downlink control channel in the wireless communication system, and the user equipment may receive the downlink control channel more stably.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

In a wireless access system, a user equipment receives information from a base station through a downlink (DL), and also transmits information to the base station through an uplink (UL). Examples of information transmitted and received between the user equipment and the base station include data and various kinds of control information. Various physical channels exist depending on types and usage of information transmitted or received between the user equipment and the base station.

Figure 1:
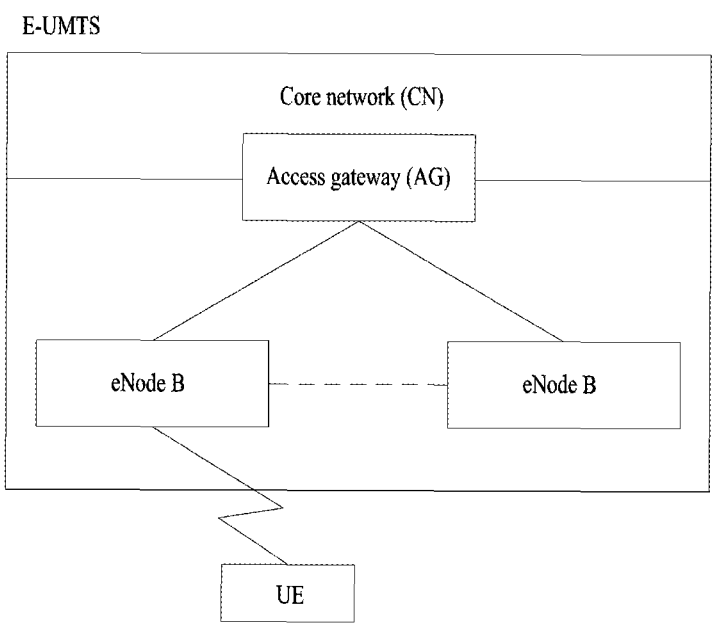
FIG. 1 is a diagram illustrating a network structure of an Evolved Universal Mobile Telecommunications System (E-UMTS) which is an example of a wireless communication system.
Figure 2:
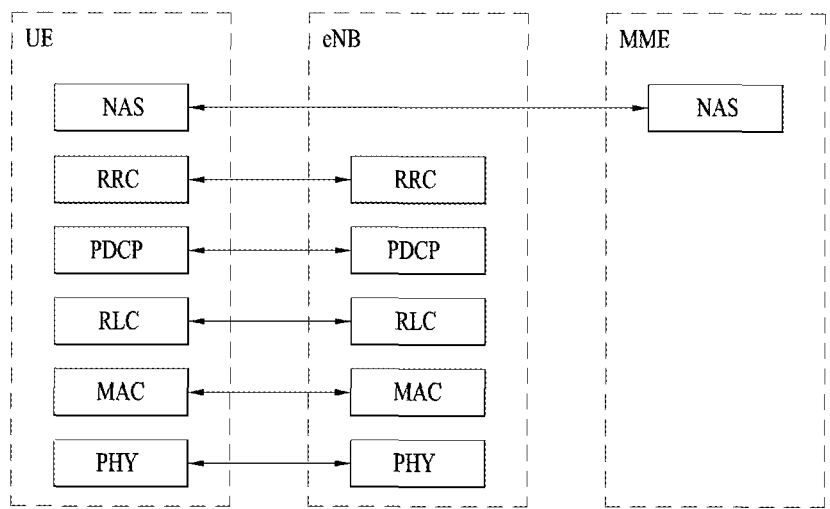
FIG. 2 is a diagram illustrating structures of a control plane and a user plane of a radio interface protocol between a user equipment and an E-UTRAN based on the 3GPP radio access network standard.
Figure 2:
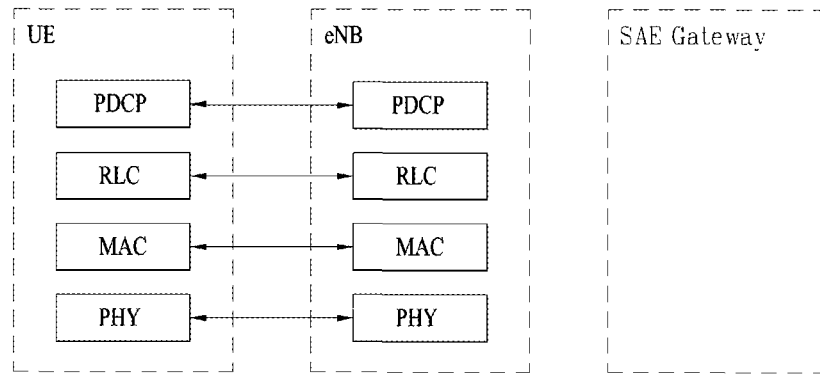

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
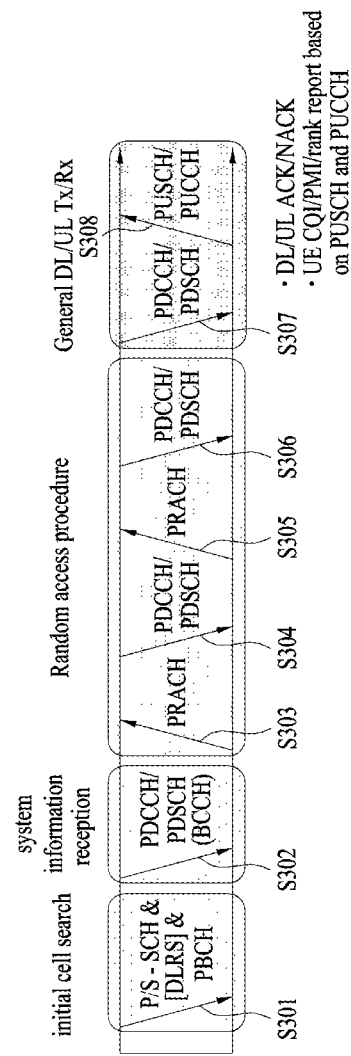
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
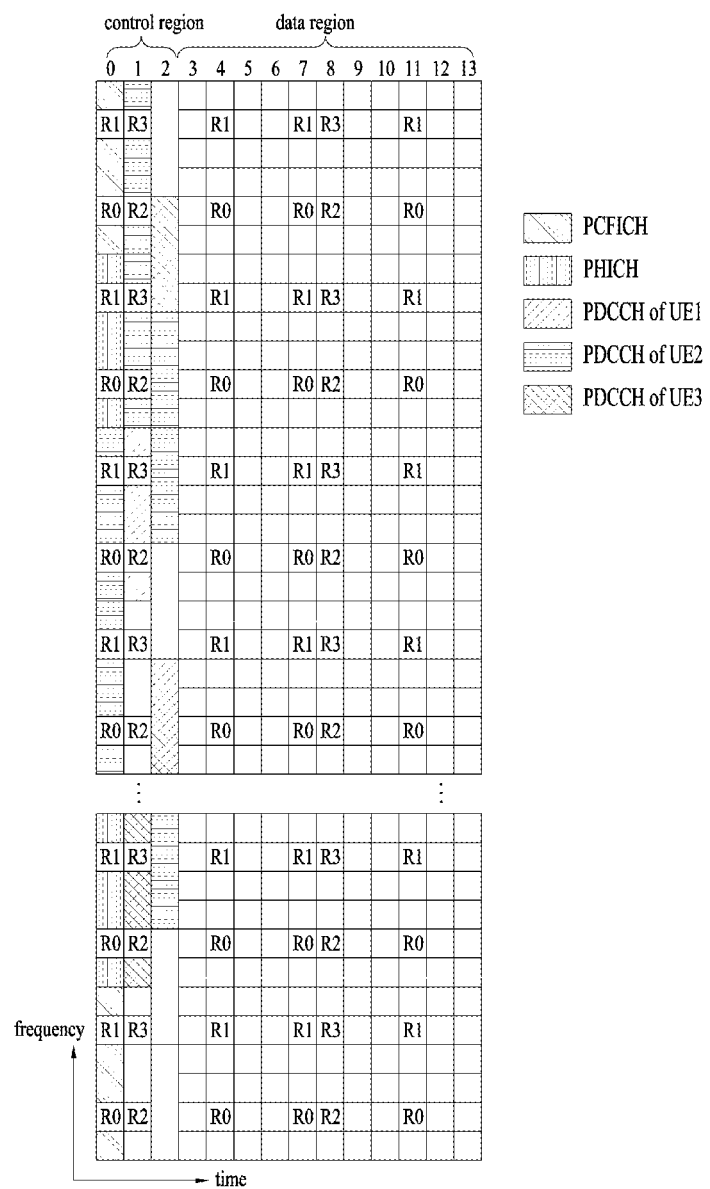
FIG. 4 is a diagram illustrating a structure of a downlink radio frame used in an LTE system.

FIG. 4 is a diagram illustrating a control channel included in a control region of one subframe in a downlink radio frame.

Referring to FIG. 4, the subframe includes fourteen (14) OFDM symbols. First one to three OFDM symbols are used as the control region in accordance with subframe configuration, and the other thirteen to eleven OFDM symbols are used as the data region. In FIG. 4, R1 to R4 represent reference signals (RS) (or pilot signals) of antennas 0 to 3. The RS is fixed by a given pattern within the subframe regardless of the control region and the data region. The control channel is allocated to a resource to which the RS is not allocated in the control region, and a traffic channel is also allocated to a resource to which the RS is not allocated in the data region. Examples of the control channel allocated to the control region include a Physical Control Format Indicator Channel (PCFICH), a Physical Hybrid-ARQ Indicator Channel (PHICH), and a Physical Downlink Control Channel (PDCCH).

The PCFICH notifies the user equipment of the number of OFDM symbols used in the PDCCH per subframe. The PCFICH is located in the first OFDM symbol and configured prior to the PHICH and the PDCCH. The PCFICH includes four resource element groups (REG), each REG being distributed in the control region based on cell identity (cell ID). One REG includes four resource elements (REs). The RE represents a minimum physical resource defined by one subcarrier×one OFDM symbol. The PCFICH value indicates a value of 1 to 3 or a value of 2 to 4 depending on a bandwidth, and is modulated by Quadrature Phase Shift Keying (QPSK).

The PHICH is a physical hybrid-automatic repeat and request (HARQ) indicator channel and is used to carry HARQ ACK/NACK signals for uplink transmission. Namely, the PHICH represents a channel where DL ACK/NACK information for UL HARQ is transmitted. The PHICH includes one REG, and is cell-specifically scrambled. The ACK/NACK signals are indicated by 1 bit, and are modulated by binary phase shift keying (BPSK). The modulated ACK/NACK are spread by a spreading factor (SF)=2 or 4. A plurality of PHICHs may be mapped with the same resource and constitute a PHICH group. The number of PHICHs multiplexed in the PHICH group is determined by the number of spreading codes. The PHICH (group) is repeated three times to obtain diversity gain in the frequency domain and/or the time domain.

The PDCCH is allocated to first n number of OFDM symbols of the subframe, wherein n is an integer greater than 1 and is indicated by the PCIFCH. The PDCCH includes one or more CCEs. The PDCCH notifies each user equipment or user equipment group of information related to resource allocation of transport channels, i.e., a paging channel (PCH) and a downlink-shared channel (DL-SCH), uplink scheduling grant, HARQ information, etc. The paging channel (PCH) and the downlink-shared channel (DL-SCH) are transmitted through the PDSCH. Accordingly, the base station and the user equipment respectively transmit and receive data through the PDSCH except for specific control information or specific service data.

Information as to user equipment(s) (one user equipment or a plurality of user equipments) to which data of the PDSCH are transmitted, and information as to how the user equipment(s) receives and decodes PDSCH data are transmitted by being included in the PDCCH. For example, it is assumed that a specific PDCCH is CRC masked with radio network temporary identity (RNTI) called "A," and information of data transmitted using a radio resource (for example, frequency location) called "B" and transmission format information (for example, transport block size, modulation mode, coding information, etc.) called "C" is transmitted through a specific subframe. In this case, one or more user equipments located in a corresponding cell monitor the PDCCH by using their RNTI information, and if there are one or more user equipments having RNTI called "A", the user equipments receive the PDCCH, and receive the PDSCH indicated by "B" and "C" through information of the received PDCCH.

However, although various communication schedules may be used to improve channel quality due to the introduction of a multi-node system and a relay node, the introduction of a new control channel will be required to apply MIMO scheme and inter-cell cooperative communication scheme to a multi-node environment. A control channel of which introduction has been discussed due to the need is an enhanced-PDCCH (E-PDCCH), and has been decided to be allocated to a data region (hereinafter, referred to as PDSCH region) not the existing control region (hereinafter, referred to as PDCCH region).

Consequently, control information on a node may be transmitted to each user equipment through the EPDCCH, whereby a problem that the existing PDCCH region may be insufficient may be solved. For reference, the EPDCCH is not provided to the existing legacy user equipment, and the LTE-A user equipment may only receive the EPDCCH.

Figure 5:
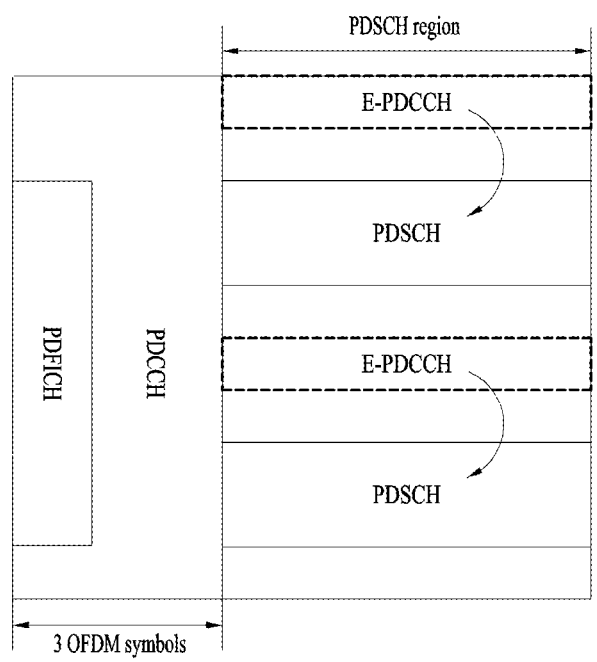
FIG. 5 is a diagram illustrating an example of an EPDCCH and a PDSCH scheduled by the EPDCCH.

FIG. 5 is a diagram illustrating an example of an EPDCCH and a PDSCH scheduled by the EPDCCH.

Referring to FIG. 5, the EPDCCH may be used by partially defining a PDSCH region for transmitting data, and the user equipment should perform a blind decoding procedure for detecting its EPDCCH. Although the EPDCCH performs the same scheduling operation (that is, PDSCH and PUSCH control) as that of the existing PDCCH, a greater number of EPDCCHs may be allocated to the PDSCH region if the number of user equipments which have accessed the same node as that of RRH. In this case, the number of times for blinding decoding that should be performed by the user equipment may be increased, whereby a problem may exist in that complexity may be increased.

Also, since the EPDCCH is transmitted together with a legacy PDCCH considering backward compatibility for supporting the existing user equipments, resource allocation information on the EPDCCH has been needed to be additionally defined together with resource allocation information of the legacy PDCCH. In other words, resource allocation information (for example, starting location of OFDM symbol index, the number of allocated OFDM symbols, etc.) of each subframe for the legacy PDCCH may be indicated through the PCFICH. However, unlike the PDCCH may be subjected to blind decoding based on a given search space by using control format indicator (CFI) information only, a problem occurs in that resource allocation information should separately be defined for the EPDCCH.

For example, in case of a relay node (RN) that allocates control information to the PDSCH region in the same manner as the EPDCCH, maximum two OFDM symbols based on a starting OFDM symbol of the subframe are set to an interval for a PDCCH of a macro eNB, and a switching gap of 1 OFDM symbol for switching to RN mode is set. Accordingly, OFDM symbols starting from the fourth OFDM symbol of the subframe may substantially be used as a resource allocation interval for R-PDCCH transmission, and the R-PDCCH starting OFDM symbol is fixed to the fourth OFDM symbol in the RN.

On the other hand, since there is no restriction in resource allocation in case of the EPDCCH unlike the R-PDCCH, a random OFDM symbol (not the symbol to which legacy PDCCH is set) may be used as a starting point for resource allocation, and proper configuration may be made for each subframe. However, in the case that the legacy PDCCH and the EPDCCH coexist on a specific subframe, another problem in restriction of resource allocation of the EPDCCH may occur in that the EPDCCH or the PDSCH cannot be allocated before resource allocation for the legacy PDCCH ends (for example).

Accordingly, the present invention suggests that an EPD-CCH region should be allocated (before allocation of legacy PDCCH) considering a resource allocation region of the legacy PDCCH on the assumption that the user equipment may know information (for example, the length of OFDM symbol to which resource is allocated) for resource allocation of the legacy PDCCH.

According to the present invention, (for example), a CFI value may be acquired by demodulation of the PCFICH, and has a value of 1 to 3 or 2 to 4 in accordance with a bandwidth. Accordingly, the present invention suggests that resources for the EPDCCH are allocated starting from the (CFI+1)th OFDM symbol (based on a time axis). According to the scheme suggested in the present invention, since the PCFICH is allocated to four REGs at a full frequency band, it is advantageous in that the user equipment does not need great operation amount by checking CFI only (through demodulation of the PCFICH only).

However, such PCFICH demodulation of the present invention may cause load in view of the user equipment, and thus the present invention additionally suggests that the EPDCCH is allocated to a location which is previously defined, considering that PCFICH demodulation error may occur.

In other words, if the user equipment may know the range of the CFI value even though the user equipment does not know the exact CFI value, it may be considered that resource allocation may be performed from next OFDM symbol of a maximum value from the range of CFI. Also, even though the user equipment knows only the range of the CFI value, resource consumption is not greater than the case where the user equipment knows the exact CFI value. At this time, the range of the CFI value may be determined considering subframe configuration and the number of downlink resource blocks (RBs). For example, subframe configuration of FDD/TDD type, MB-SFN/non MB-SFN, etc. may be determined previously, or may be indicated to the user equipment. Also, the number of downlink resource blocks (RBs) may be indicated to the user equipment by using PBCH information. In this case, it may be difficult to allocate resources adaptively per subframe, and efficiency of resource allocation is reduced. In this respect, it is preferable that resource is allocated starting from next OFDM symbol of the region to which the legacy PDCCH is actually transmitted, or resource is allocated by being fixed to OFDM symbol corresponding to a specific index.

Figure 6:
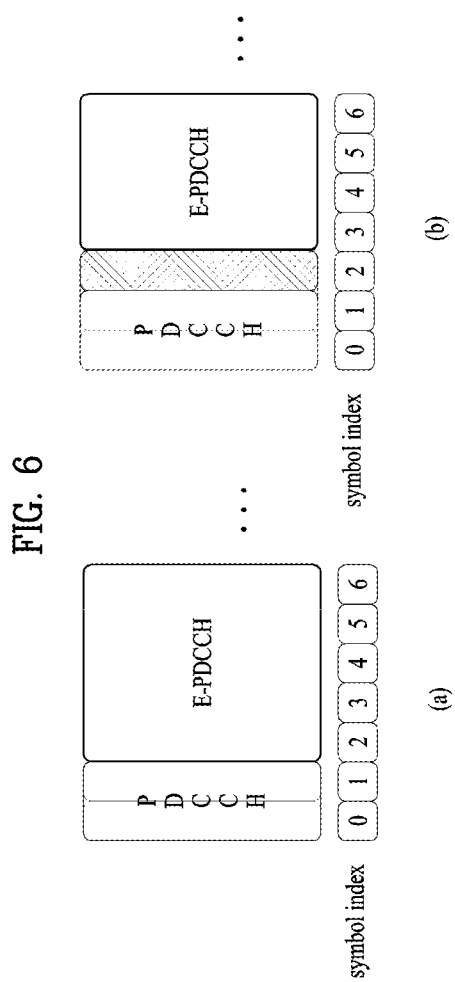
FIG. 6 is a diagram illustrating an allocation scheme of an EPDCCH suggested in the present invention.

FIG. 6 is a diagram illustrating an allocation scheme of an EPDCCH based on CFI suggested in the present invention.

Referring to FIG. 6(a), in the present invention, the EPDCCH may be allocated starting from next OFDM symbol of the region (OFDM symbol index) to which the legacy PDCCH is actually allocated. If the OFDM symbol index to which the legacy PDCCH is allocated corresponds to 1, the EPDCCH is allocated sequentially starting from OFDM symbol index 2. Unlike FIG. 6(a), FIG. 6(b) illustrates that the EPDCCH is allocated to OFDM symbol corresponding to a specific index regardless of an actual resource allocation region of the legacy PDCCH. For example, if the EPDCCH is fixed by being allocated starting from OFDM symbol index 3, even though the legacy PDCCH is allocated to reach OFDM symbol index 1, the EPDCCH may be allocated starting from OFDM symbol index 3 which is previously determined. Accordingly, in case of FIG. 6(b), stable resource allocation of the EPDCCH may be performed regardless of resource allocation of the legacy PDCCH.

Also, the present invention may additionally consider that resource allocation is performed through a common search space and a UE-specific search space.

Figure 7:
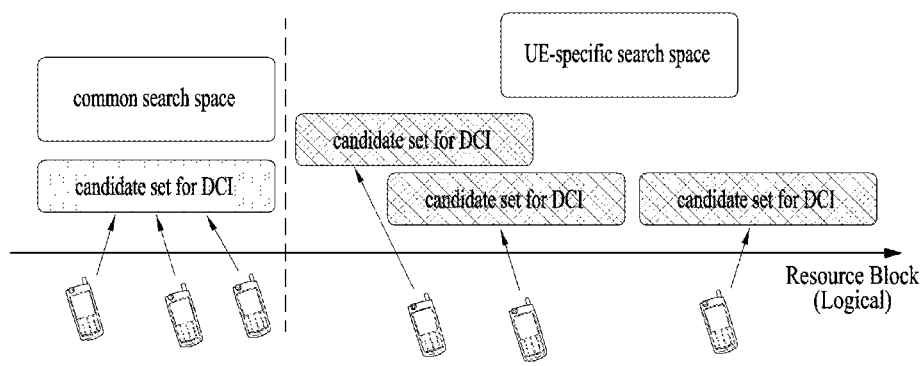
FIG. 7 is a diagram illustrating a common search space and a user equipment (UE) specific search space.

FIG. 7 is a diagram illustrating a common search space and a user equipment (UE) specific search space.

Referring to FIG. 7, the common search space (CSS) is a search space which may be accessed commonly by all the user equipments to detect DCI(s) for all the user equipments, whereas the UE-specific search space corresponds to a space where DCI(s) indicating UE dedicated data may be detected. Accordingly, there is little need to apply the same resource allocation scheme to the common search space (CSS) and the UE-specific search space (USS). The common search space (CSS) is preferably configured without specific signaling, separate channel such that all the user equipments may use the CSS during demodulation. The UE-specific search space (USS) is preferably configured to use a scheme designated for each user equipment.

In other words, in the scheme that the legacy PDCCH region is estimated using the CFI value only, the EPDCCH is allocated to next OFDM symbol of the legacy PDCCH region which is estimated in error if error occurs in estimation of the CFI value, whereby a problem may occur in that resource allocation is repeatedly performed (or resource allocation is not performed for a specific RE).

Table 1 illustrates the number of OFDM symbols allocated for the legacy PDCCH.

TABLE 1

| Subframe | Number of OFDM symbols for PDCCH when $N_{RB}^{DL} > 10$ | Number of OFDM symbols for PDCCH when $N_{RB}^{DL} \leq 10$ |
|---|---|---|
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

Referring to Table 1, it is assumed that resource allocation is performed starting from next OFDM symbol of a maximum value that may be owned by CFI (on a time axis of resource block). If the number of downlink resource blocks (RBs) is more than 10, maximum three OFDM symbols are allocated. In case of MBSFN subframe or TDD subframe, maximum two OFDM symbols are only allocated. Meanwhile, in case of a narrow band of which the number of downlink resource blocks is less than 10, maximum four OFDM symbols may be used to transmit the PDCCH.

Referring to Table 1, if the CSS is allocated to the resource block corresponding to one time axis slot, the maximum CFI value may be 0, 2, 3, or 4 in accordance with subframe configuration when the number of resource blocks for a downlink is less than 10, and CSS starting symbol index may correspond to one of first, third, fourth and fifth symbol indexes. Also, when the number of RBs for a downlink is more than 10, the maximum CFI value may be 0, 1, 2, or 3 in accordance with subframe configuration, and CSS starting symbol index may correspond to one of first, second, third, and fourth symbol indexes.

Currently, according to 3GPP TS36.213 "Evolved Universal Terrestrial Radio Access (E-UTRA) Physical layer procedures", the starting symbol of the EPDCCH is determined on the basis of the first slot of the subframe in accordance with higher layer signaling or the CFI value.

However, since many CSS resources may not be obtained for the first (time axis) one of two slots constituting the subframe, supposing that the CSS is allocated from the first OFDM symbol of the second (time axis) slot, more stable allocation may be performed.

Also, if a receiver may perform decoding in real time while requiring very small time latency of one or two symbol level, a region for allocating the EPDCCH may be varied depending on the amount of resources (the number of REs) allocated to the PDSCH.

For example, if the user equipment previously knows information (or channel information) on a valid reference signal for decoding (for example, if it is assumed that a channel which is not flexible may use channel information of a previous subframe as it is), it is assumed that EPDCCH data are sequentially allocated in time.

In this case, if there are many resources allocated to the PDSCH (if many REs are allocated to the PDSCH), since relatively much processing time is required, it is preferable to reduce processing time by allocating the EPDCCH to the first time slot of the subframe. By contrast, if relatively small processing time is required due to small resources allocated to the PDSCH (if small REs are allocated to the PDSCH), it is preferable to allocate the EPDCCH to the second time slot of the subframe. In particular, since the common search space (CSS) is not a search space which requires a high data rate, it is more preferable to allocate the EPDCCH to the second time slot of the subframe.

Accordingly, in the present invention, the starting OFDM symbol index to which the CSS is allocated may be determined between a minimum value corresponding to (CFI maximum value+1) in the corresponding subframe configuration and the maximum value corresponding to the first OFDM symbol index of the second time slot by using RRC signaling (from higher layer).

Also, in the present invention, the starting OFDM symbol index to which resource for the PDSCH corresponding to the CSS is allocated may be indicated together with the starting OFDM symbol index to which the CSS is allocated.

Since information on the corresponding region cannot be demodulated before the CSS starts, it is no use allocating the PDSCH region indicated by the CSS earlier than the starting symbol of the CSS. Also, even in case that the PDSCH region is allocated after the CSS is allocated, since sufficient processing time cannot be obtained, it is preferable to allocate the resource allocation starting symbol of the PDSCH region indicated by the CSS equally to the CSS starting symbol.

Figure 8:
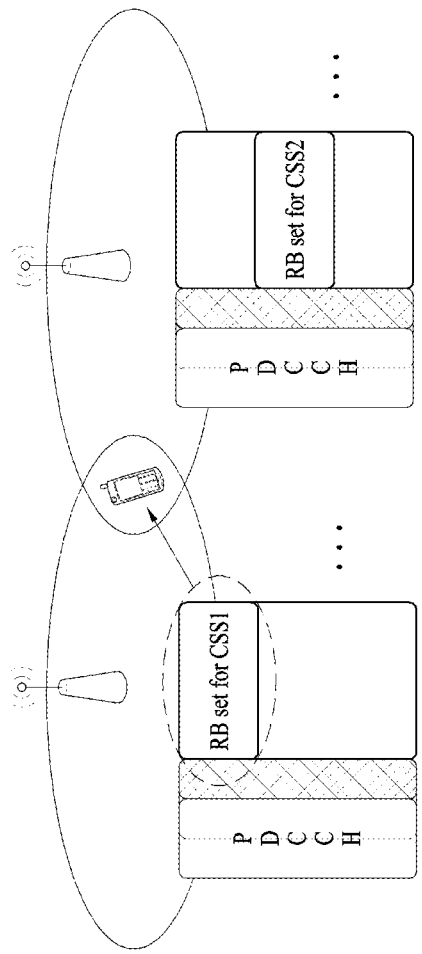
FIG. 8 is a reference diagram illustrating an embodiment of the present invention, which supports ICIC.

Moreover, in the present invention, a frequency domain may be specified to use RB set. FIG. 8 is a reference diagram illustrating an embodiment of the present invention, which supports ICIC.

Referring to FIG. 8, supposing that inter-cell interference coordination (ICIC) is applied to a CSS region to reduce inter-cell interference, it is general that a given resource is allocated at a given location in case of the CSS region. Accordingly, a specific frequency domain may only be used in the frequency domain cell-specifically.

Figure 9:
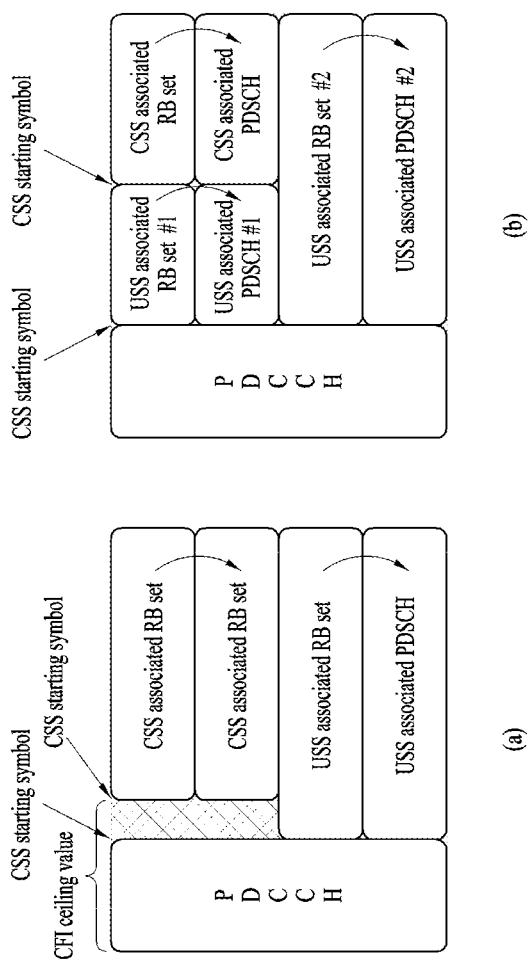
FIG. 9 is a diagram illustrating a common search space (CSS), a user equipment (UE) specific search space (USS), and a PDSCH associated with the CSS and the USS.

FIG. 9 is a diagram illustrating a common search space (CSS), a user equipment (UE) specific search space (USS), and a PDSCH associated with the CSS and the USS.

Referring to FIG. 9(*a*), the common search space (CSS) may be allocated starting from a fixed specific symbol index, and the UE-specific search space (USS) may be allocated starting from next OFDM symbol index after legacy PDCCH is actually allocated. For example, the user equipment may discover a time axis length of a legacy PDCCH region by demodulating the PCFICH. As a result, allocation is performed starting from next OFDM symbol of the last OFDM symbol of the legacy PDCCH region. An index value of the starting OFDM symbol to which the PDSCH associated with the USS is allocated is determined as the same value as that of the starting OFDM symbol index of the USS. If the CSS is allocated to the second time slot as shown in FIG. 9(*b*), it is preferable to allocate the USS and the PDSCH associated with the USS to the first time slot. Moreover, cell-specific RB set is used in association with eICIC for stable demodulation in the common search space (CSS), and RB set used by the UE-specific search space (USS) is allocated as a resource of a frequency domain different from that allocated to the CSS. If the common search space (CSS) and the UE-specific search space (USS), which have their respective starting OFDM symbols different from each other, share the same RB set, combinations having different configurations may be generated in one RB (in this case, since symbol starting points of CCEs are different from one another, resource allocation may not be performed for a specific RE). Accordingly, in order to prevent this status from occurring, the RB set used by the USS is allocated as a resource of a frequency domain different from that allocated to the CSS.

Figure 10:
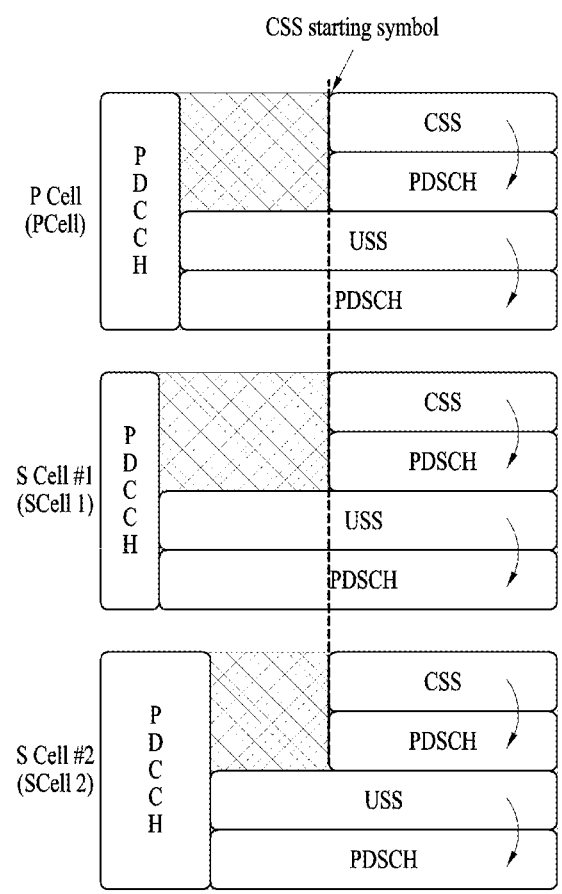
FIG. 10 is a diagram illustrating a common search space (CSS), a user equipment (UE) specific search space (USS), and a PDSCH associated with the CSS and the USS according to application of carrier aggregation (CA) of the present invention.

FIG. 10 is a diagram illustrating a common search space (CSS), a user equipment (UE) specific search space (USS), and a PDSCH associated with the CSS and the USS if the present invention is applied to a system that supports carrier aggregation (CA).

Referring to FIG. 10, even in case of a carrier aggregation (CA) system, the common search space (CSS) is based on RRC signaling and the UE-specific search space (USS) is based on a size (for example, the number of allocated REs) of a legacy PDCCH region which is actually allocated). When a starting symbol index of the common search space (CSS) is determined, a common value for all the carriers used in the carrier aggregation system should be designated. At this time, since the legacy PDCCH region may have different sizes per carrier, the CSS starting symbol is determined considering features of all the carriers.

Figure 11:
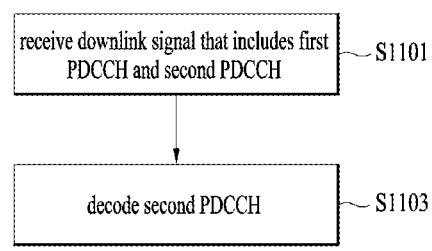
FIG. 11 is a diagram illustrating a downlink reception operation of a user equipment according to the embodiment of the present invention.

FIG. 11 is a diagram illustrating a downlink reception operation of a user equipment according to one embodiment of the present invention.

The user equipment receives a downlink signal, which includes a first physical downlink control channel (PDCCH) and a second downlink control channel (enhanced PDCCH: EPDCCH) (S1101). At this time, as described above, the starting OFDM symbol index of the second downlink control channel is greater than the last OFDM symbol index of the first downlink control channel.

The user equipment may detect control information by decoding a search space allocated from the starting OFDM symbol index of the second downlink control channel for the received downlink signal (S1103).

Moreover, the user equipment may further decode a downlink data channel corresponding to the second downlink control channel. It is preferable that the starting symbol index of the downlink data channel is defined equally to the starting symbol index of the second downlink control channel as described above.

Figure 12:
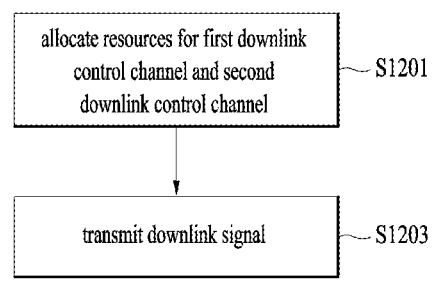
FIG. 12 is a diagram illustrating a downlink transmission operation of a base station according to the embodiment of the present invention.

FIG. 12 is a diagram illustrating a downlink transmission operation of a base station according to the embodiment of the present invention.

The base station allocates resources for the first downlink control channel (PDCCH) and the second downlink control channel to the downlink signal (S1201). In the present invention, the starting OFDM symbol index of the second downlink control channel is determined to be greater than the last OFDM symbol index of the first downlink control channel as described above, and resource allocation of the first downlink control channel and the second downlink control channel may be performed in a random order. Moreover, resources for a downlink data channel corresponding to the second downlink control channel may be allocated to the downlink signal. At this time, as described above, it is preferable that the starting symbol index of the downlink data channel is defined equally to the starting symbol index of the second downlink control channel. The base station transmits the downlink signal by using the allocated resources (S1203).

Figure 13:
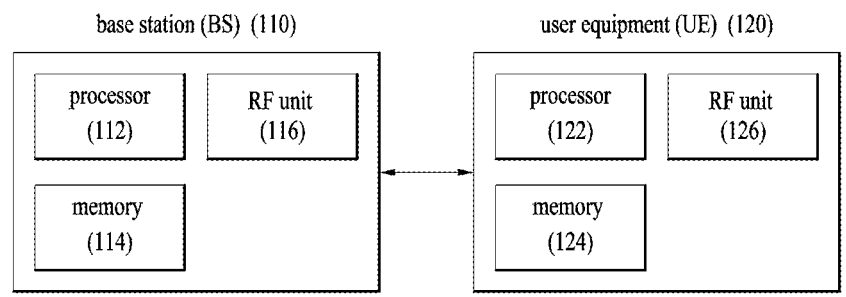
FIG. 13 is a diagram illustrating a base station and a user equipment, which may be applied to the embodiment of the present invention.

FIG. 13 is a diagram illustrating a base station and a user equipment which may be applied to the embodiment of the present invention. If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 13, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method and for transmitting and receiving a downlink control channel and a data channel in a wireless communication system and the apparatus therefor have been described based on the 3GPP LTE system, the method and apparatus may be applied to various wireless communication systems in addition to the 3GPP LTE system.

The invention claimed is:

1. A method for allowing a user equipment (UE) to receive a downlink control channel in a wireless communication system, the method comprising:
  receiving an EPDCCH (Enhanced Physical Downlink Control CHannel) configuration including resource mapping parameters for an EPDCCH via an RRC (Radio Resource Control) signaling,
  wherein if the EPDCCH configuration is associated with a multiple point transmission, a starting OFDM (Orthogonal Frequency Division Multiplexing) symbol for the EPDCCH is set as a starting symbol for a PDSCH (Physical Downlink Shared Channel) data transmission related with the multiple point transmission; and
  monitoring a search space to decode the EPDCCH from the starting OFDM symbol in a resource block set for the EPDCCH according to the resource mapping parameters for the EPDCCH.

2. The method according to claim 1, wherein the search space is configured as a UE-specific search space.

3. The method according to claim 1, wherein the EPDCCH configuration further indicates an MBSFN (multimedia broadcast single frequency network) subframe or not.

4. A user equipment for receiving a downlink signal in a wireless communication system, the user equipment comprising:

a radio frequency (RF) unit; and
a processor operatively coupled to the RF unit,
wherein the processor is configured to:
receive an EPDCCH (Enhanced Physical Downlink Control CHannel) configuration including resource mapping parameters for an EPDCCH via an RRC (Radio Resource Control) signaling,
wherein if the EPDCCH configuration is associated with a multiple point transmission, a starting OFDM (Orthogonal Frequency Division Multiplexing) symbol for the EPDCCH is set as a starting symbol for a PDSCH (Physical Downlink Shared Channel) data transmission related with the multiple point transmission, and
monitor a search space to decode the EPDCCH from the starting OFDM symbol in a resource block set for the EPDCCH according to the resource mapping parameters for the EPDCCH.

* * * * *